United States Patent Office 3,644,536
Patented Feb. 22, 1972

3,644,536
PROCESS FOR 1,3,5-TRIS(α-HYDROXY-
ISOPROPYL)BENZENE
Richard A. Bafford, Tonawanda, N.Y., assignor to
Pennwalt Corporation, Philadelphia, Pa.
No Drawing. Filed Sept. 18, 1969, Ser. No. 859,193
Int. Cl. C07c 29/00
U.S. Cl. 260—618 R                11 Claims

ABSTRACT OF THE DISCLOSURE

Preparation of 1,3,5-tris (α-hydoxyisopropyl)benzene by heating a solvent solution of methylbutynol in presence of catalytic amount of nickel tetracarbonyl and a triarylphosphite.

---

The oligomerization of acetylenes to produce aromatic compounds along with a wide variety of other products is well-known. The catalysts used for these reactions have been generally organometallic complexes containing transition metals such as chromium, cobalt or nickel.

The oligomerization of 2-hydroxy-2-methylbutyne-3 (hereinafter called methylbutynol) using bis(triphenylphosphine) nickel dicarbonyl has been claimed by McKeever and Hook (U.S. Pat. 2,542,551) to give 1,3,5-tris(α-hydroxyisopropyl)benzene in undisclosed yield and having a melting point of 140–2° C. A subsequent publication by Merriwether et al. (J. Org. Chem. 26, 5755 (1961) reported that the product claimed by McKeever and Hook was not 1,3,5-tris(α-hydroxyisopropyl)benzene, but was 2,9 - dimethyl-6-(1-hydroxy-1-methylethyl)-3,5-decadiene-7-yne-2,9-diol of structure

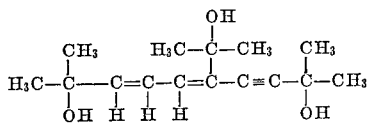

Rose and Statham did not isolate any product from the reaction of methylbutynol and bis(triphenylphosphine) nickel dicarbonyl (J. Chem. Soc. 69 (1950). However, Chini et al. (J. Chem. Soc. 1967, 830) showed that the same catalyst gives a mixture of products, less than 25% of which is the 1,3,5-product. French Pat. 1,397,654 discloses a process using the same reactants, and reports the isolation of a trimer melting at 119–124° C. The same patent discloses the preparation of 1,2,4-tris(α-hydroxyisopropyl)benzene (M.P. 184–5°) from methylbutynol and cobalt tricarbonyl nitrosyl. German Pat. 1,159,951 claims the preparation of 1,3,5-tris(α-hydroxyisopropyl) benzene from methylbutynol using a complex nickel compound which is free of carbon monoxide and contains trithymyl phosphite. It is obvious that the state of art is quite confused.

In accord with this invention a surprisingly simple and economical process has been found for the conversion of methylbutynol, in very high yields, to a crystalline tris-alcohol consisting predominately of 1,3,5-tris-(α-hydroxyisopropyl)benzene; e.g.

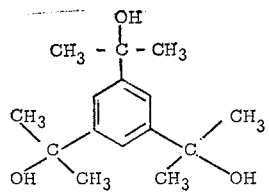

This novel process involves simply the heating of methylbutynol in a non-aqueous solvent and in the presence of a catalytic amount of nickel tetracarbonyl and an ortho-substituted triaryl phosphite, whereby the product tris-alcohol, is formed, and, in a preferred technique, precipitates from the reaction mass in high purity.

The tris-alcohol product is of valuable utility in that it can be used directly without any further purification for conversion to the corresponding tris-peroxide, which is of value as a cross-linking agent for elastomers and thermoplastic polymers.

In carrying out the process of the invention methylbutynol is slowly added to a heated inert organic solvent containing a triaryl phosphite and nickel carbonyl in solution. After an induction period, an exothermic reaction sets in which is controlled by the rate of addition of the methylbutynol. When all the methyl butynol has been added and the exotherm subsides, the reaction mixture is heated for an additional time to complete the reaction. When all the methylbutynol has been added, the tris-alcohol will spontaneously precipitate out of the reaction mixture when the preferred solvents are used, and, accordingly, efficient agitation is desirable. Although nickel carbonyl is sensitive to oxygen the reaction need not be carried out in an inert atmosphere. After the nickel carbonyl is transferred to the reaction solvent containing the triaryl phosphite, air may be present without significant reduction in yield. In two duplicate runs, one under a nitrogen atmosphere and the other in the air, the respective yields of tris alcohol were 91 and 88%. Since some carbon monoxide is given off during the reaction, provision must be made for destroying or venting off this very toxic gas.

When the reaction is complete, the reaction mixture is cooled to room temperature and the crystalline product is filtered off, washed with cold solvent and air-dried. The yield is generally 90–95% and the melting point of the product is 140–150° C. This product can be readily peroxidized without any further purification. The triaryl phosphites used may be commercial grade materials or, if not commercially available, easily prepared from the desired phenol and phosphorus trichloride. The triaryl phosphites should be free of any diaryl chlorophosphites or aryl dichlorophosphites since such compounds can react with methylbutynol to give hydrogen chloride which might lower the yield of tris-alcohol by dehydrating the methylbutynol.

Suitable solvents for the reaction include those which do not interact with the catalyst components or with methylbutynol and those solvents are preferred in which methylbutynol is completely miscible, but in which the tris-alcohol product is insoluble. Preferred solvents are those having a boiling point of from about 60° to 90° C. so that the reaction can be moderated by the refluxing solvent.

The following classes of solvents can be used; alcohols, ketones, esters, aliphatic hydrocarbons and aromatic hydrocarbons. In Table I are listed some of the preferred solvents, their boiling points and their major advantages and disadvantages.

The reaction can be carried out at from 40 to 120° C., preferably 60–90° C. The reaction time is a function of catalyst concentration, reaction temperature and polarity of the solvent. The reaction rate is faster in more polar solvents, but is generally from 3 to 12 hours and usually 3 to 5 hours for completion of the reaction.

Although traces (0–1%) of water do not interfere with the reaction, it is preferably run under substantially anhydrous conditions in order to avoid hydrolysis of the phosphite catalyst.

TABLE I.—REACTION SOLVENTS

| Solvent | B.P. degrees | Advantages | Disadvantages |
|---|---|---|---|
| Benzene | 80 | Completely miscible with methylbutynol. Tris alcohol less than 0.5% soluble at room temperature. | None. |
| Acetone | 56 | Completely miscible with methylbutynol. Tris alcohol less than 10% soluble at room temperature. | Do. |
| Ethyl acetate | 77 | Completely miscible with methylbutynol. Tris alcohol about 7% soluble at room temperature. | Do. |
| Hexane | 69 | Completely miscible with methylbutynol. Tris alcohol insoluble at room temperature. | Do. |
| Cyclohexane | 81 | Completely miscible with methylbutynol. Tris alcohol insoluble at room temperature. | Do. |
| Ethanol | 78 | Completely miscible with methylbutynol. Reaction very rapid. | Tris-alcohol very soluble. Solvent must be stripped out to recover product. |
| Toluene | 110 | Completely miscible with methylbutynol. Tris alcohol less than 1% soluble at room temperature. | Higher reaction temperature leads to some discoloration of product. |
| Isoheptanes (commercial mixture of branched heptanes). | 83–93 | Completely miscible with methylbutynol. Tris alcohol insoluble at room temperature. | None. |

The catalyst, as indicated, is a two component system consisting of nickel carbonyl and a triaryl phosphite and is highly specific. While cobalt tricarbonyl nitrosyl is an effective catalyst for the preparation of 1,2,4-tris($\alpha$-hydroxyisopropyl)benzene, cobalt carbonyl, in place of nickel carbonyl, is completely ineffective in the system of the invention (see Example 9). Nickel carbonyl, in the absence of the triaryl phosphite, gives only tars. Other triaryl phosphites not within the scope set out above give other unwanted products such as 1,3,5,7-tetrakis($\alpha$-hydroxyisopropyl)cyclooctatetraene compounds. The catalsts used in the process of the invention are far superior to the known bis(triphenylphosphine)nickel dicarbonyl and also to the nickel (O)-triaryl phosphite complexes of the prior art.

The aryl phosphite catalysts are defined by the structure $(R_nArO)_3P$ where Ar is an aryl group such as phenyl or naphthyl, R is alkyl, cycloalkyl, or aryl and $n$ is integer (1 to 4 when Ar is phenyl, and 0 to 6 when Ar is naphthyl) and with the proviso that at least one R group be in an ortho position (i.e. adjacent the position of the oxygen atom) and that the second ortho position be unsubstituted. Preferably, the phosphite will be a phenyl phosphite of structure ( 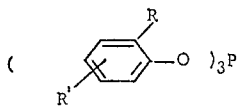 $-O\ )_3P$ where R is alkyl (one to six carbon atoms) or aryl (phenyl), and R' is in a meta or para position and is hydrogen, alkyl or aryl. Most preferably R will be a bulky alkyl group such as t-butyl or t-amyl and R' will be alkyl. Table II lists examples triaryl phosphites operable in the invention.

TABLE II
Operable triaryl phosphites $(R_nArO)_3P$

| Ar | R | n | Name |
|---|---|---|---|
| C$_6$H$_4$ | CH$_3$ | 1 | Tri-(o-cresyl)phosphite. |
| C$_6$H$_4$ | C$_2$H$_5$ | 1 | Tris-(o-ethylphenyl) phosphite. |
| C$_6$H$_4$ | C$_3$H | 1 | Tris-(o-isopropylphenyl) phosphite. |
| C$_6$H$_3$ | C$_3$H$_7$, CH$_3$ | 2 | Tris-(2-isopropyl-5-methylphenyl) phosphite (also known as trithymyl phosphite). |
| C$_6$ | C$_4$H$_9$ | 2 | Tris-(o-sec-butyl-phenyl) phosphite. |
| C$_6$H$_4$ | C$_4$H$_9$, CH$_3$ | 2 | Tris-(2-sec-butyl-5-methylphenyl) phosphite. |
| C$_6$H$_4$ | C$_4$H$_9$ | 1 | Tris-(o-t-butylphenyl) phosphite. |
| C$_6$H$_3$ | C$_4$H$_9$ | 2 | Tris-(2,4-di-t-butylphenyl) phosphite. |
| C$_6$H$_3$ | C$_4$H$_9$ | 2 | Tris-(2,5-di-t-butylphenyl) phosphite. |
| C$_6$H$_3$ | C$_4$H$_9$, CH$_3$ | 2 | Tris-(2-t-butyl-4-methylphenyl) phosphite. |
| C$_6$H$_3$ | C$_4$H$_9$, CH$_3$ | 2 | Tris-(2-t-butyl-5-methylphenyl) phosphite. |
| C$_6$H$_4$ | C$_5$H$_{11}$ | 1 | Tris-(o-t-amylphenyl) phosphite. |
| C$_6$H$_4$ | C$_5$H$_{11}$ | 1 | Tris-(o-sec-amylphenyl) phosphite. |
| C$_6$H$_4$ | C$_6$H$_5$ | 1 | Tris-(o-(o-biphenylyl) phosphite. |
| C$_6$H$_2$ | CH$_3$ | 3 | Tris-(2,3,5-trimethylphenyl) phosphite. |
| C$_6$H$_3$ | C$_3$H$_7$ | 2 | Tris-(2,5-diisopropylphenyl) phosphite. |
| C$_6$H$_3$ | C$_5$H$_{11}$ | 2 | Tris-(2,4-di-t-amyphenyl) phosphite. |
| C$_{10}$H$_9$ | | | Tri-1-naphthyl phosphite. |
| C$_6$H$_4$ | C$_6$H$_{11}$ | 1 | Tris-(o-cyclohexylphenyl) phosphite. |

The mole ratio of triaryl phosphite to nickel carbonyl is not critical and can vary from 1 to 4 or even higher. However, it is preferable that it not be less than one since this can lead to formation of tarry products and preferably, a mole ratio of 1:1 will be used. The mole ratio of nickel carbonyl to methyl butynol can vary from $0.5 \times 10^{-3}$ to $1 \times 10^{-2}$. The catalyst is very active and a 95% yield of tris-alcohol can be obtained within 5 hours using only $1.09 \times 10^{-3}$ mole each of nickel carbonyl and triaryl phosphite per mole of methylbutynol. Too high a catalyst level will give very fast conversion rates, the exotherm from which might be difficult to control. For this and for economic reasons, the lower catalyst levels are preferred. The yield of tris-alcohol is independent of the ratio of triaryl phosphite to nickel carbonyl but, as indicated, both the nickel carbonyl and the triaryl phosphite are necessary.

Table III which follows illustrates the effect of the nickel carbonyl aryl phosphite ratios:

TABLE III.—PREPARATION OF TRIS ALCOHOL—EFFECT OF NICKEL CARBONYL/ARYL PHOSPHITE

Reaction conditions: 300 g. (3.57 moles) methylbutanol, 150 ml. of benzene. Reaction temp. 80° C.; reaction time 5 hours, aryl phosphite; tris-(2-t-butyl-5-methylphenyl) phosphite

| Nickel, moles | Carbonyl, gm. | Aryl phosphite | | Tris-alcohol | |
|---|---|---|---|---|---|
| | | Moles | Gm. | Yield | M.P., degrees |
| 0.004 | 0.682 | 0 | 0 | [2] 0 ........ | ([1]) |
| .004 | 0.682 | .004 | 2.08 | [2] 279 (93%) | 139–152 |
| .004 | 0.682 | .008 | 4.16 | [2] 273 (91%) | 143–152 |
| .004 | 0.682 | .016 | 8.32 | [2] 273 (91%) | 142–151 |

[1] Only tarry residue.
[2] Grams.

It is to be understood that although the process of the invention gives excellent yields of high purity 1,3,5-tris($\alpha$-hydroxyisopropyl)benzene, there will be present in the reaction products small amounts of other products derived from the starting methylbutynol. Thus there may be some 1,2,4-tris-($\alpha$-hydroxyisopropyl)benzene, and/or some linear polymer such as 2,9-dimethyl-6-(1-hydroxy-1-methylethyl)-3,5-decadiene-7-yne-2,9-diol. These by-products are in minor amounts (less than 10% of total product) and since they do not interfere with use of the product as an intermediate to the tris-peroxide, separation is not necessary.

As indicated, the triarylphosphite used in the process is readily prepared by reaction of phosphorus trichloride and the appropriate phenol. The following examples illustrate the method:

Example 1.—Preparation of triaryl phosphites

A 500 ml. round-bottom flask was equipped with a reflux condenser with provisions for venting off hydrogen chloride and for preventing back-diffusion of moisture into the flask.

Phosphorus trichloride (27.5 g. 0.2 mole) and 131.4 g. (0.8 mole) of 2-t-butyl-5-methylphenol were placed in the flask and heated for one hour at 80° C. The temperature was then raised to 200° C. and kept there for a total of nine hours. During the last three hours of heating, the pressure was reduced to 20 mm. by means of water aspirator in order to drive off any remaining hydrogen chloride and unreacted PCl$_3$.

Unreacted phenol was then removed by distillation at 65–80° C. at 0.02 mm. The recovered phenol weighed 43.7 g. The residue, weighing 90.2 g. (97% yield based on phenol consumed) was a viscous oil which when slurried with 50 ml. of methanol gave a colorless crystalline product which was filtered off, washed with methanol and air dried. The crystals weighed 75.2 g. (83.4% yield based on phenol consumed) and melted at 95–101° (analysis, P: theory 5.95%; found 5.90%). The melting point can be raised to 110–111° by recrystallization from methanol.

The other phosphites listed in Table IV were prepared in an analogous manner.

The following examples will serve to further illustrate the invention.

Example 2

A one-liter flask was equipped with a paddle stirrer, a pressure equalized addition funnel, two reflux condensers, and provision for operating in a nitrogen atmosphere. Into the flask was placed 150 ml. of benzene, 2.08 g. (0.004 m.) of tris(2-t-butyl-5-methylphenyl)phosphite and 0.52 ml. (0.65 g., 0.004 m.) of nickel carbonyl (inserted with a hypodermic syringe). In the funnel was placed 300 g. (3.57 moles) of methylbutynol. The flask was heated by a steam bath and the methylbutynol was added over a one hour period. The reaction mixture became very dark within 15 minutes. After 45 minutes the reaction became mildly exothermic and external heating was reduced. After 75 minutes, the product began to separate as a crystalline solid. The reaction mixture was refluxed for a total of five hours. When cool, the reaction mixture was filtered and the filter cake washed with about 250 ml. of benzene to remove the color. The almost colorless crystalline product weighed 272.5 g. (91% of theory) and melted at 143–50° C.

From spectral studies (NMR, IR, UV), catalytic hydrogenation and fractional crystallization it was shown that this product consists of about 90–92% of 1,3,5-tris-($\alpha$-hydroxyisopropyl)benzene, 1.0 to 1.5% of 1,2,4-tris($\alpha$-hydroxyisopropyl)benzene and the remainder is the linear trimer.

TABLE IV.—TRIARYL PHOSPHITES

| Phosphite | Yield (percent) | M.P. (or B.P.) | Percent P Theory | Percent P Found |
|---|---|---|---|---|
| Tris(2-t-amylphenyl) | 50 | (196–99° at 0.01 mm.) | 5.95 | 6.3 |
| Tris(3-t-butylphenyl) | 64 | (193–98° at 0.02 mm.) | 6.46 | 6.44 |
| Tris(3-methylphenyl) | 57 | (164–71° at 0.01 mm.) | 8.78 | 9.0 |
| Tris(2-methyl-4-t-butylphenyl) | 38 | 75–7° (235 at 0.06 mm.) | 5.95 | 5.6 |
| Tris(2,4-di-t-butylphenyl) | 59 | 175–181° | 4.78 | 4.75 |
| Tris(2,5-di-t-butylphenyl) | 43 | 123–125° | 4.78 | 4.4 |
| Tris(2,4-di-t-amylphenyl) | 49 | 101–103° | 4.24 | 4.2 |
| Tris(2-cyclohexylphenyl) | 55 | 62–64° | 5.49 | 5.6 |
| Tris(3,5-di-t-butyl phenyl) | 7 | 72–74° | 4.78 | 4.48 |
| Tris(2-methylphenyl) phosphite | 77 | (173–6° at 0.02 mm.) | 8.78 | 8.59 |
| Tris(2-isopropylphenyl)phosphite | 91 | (174–6° at 0.03 mm.) | 7.10 | 7.4 |
| Tris(2-t-butylphenyl) phosphite | 62 | 66–8° | 6.46 | 6.53 |
| Tris(2-sec-butylphenyl) phosphite | 61 | (160–5° at 0.01 mm.) | 6.46 | 7.0 |
| Tris(4-t-butylphenyl) phosphite | 71 | 73–5° | 6.46 | 6.5 |
| Tris(2-t-butyl-4-methylphenyl) phosphite | 42 | 105–7° | 5.95 | 6.2 |
| Tris(2-isopropyl-5-methylphenyl) phosphite | 75 | (175° at 0.01 mm.) | 6.46 | 6.44 |
| Tris(2-biphenylyl) phosphite | 48 | 77–79° | 5.75 | 6.1 |
| Tris(2-t-butyl-6-methyl phenyl) | 25 | 87–8° | 5.95 | 5.96 |
| Tris(2,6-diisopropylphenyl) | 56 | 230–35° | 5.47 | 5.46 |
| Tris(2-t-butyl-4-phenylphenyl) | 66.5 | Glass, softens 50–60° | 4.38 | 4.37 |

Example 3

The process and raw materials used were identical to those of Example 2 except that 400 g. (4.76 moles) of methylbutynol was used. The yield of tris-alcohol (M.P. 142–50°) was 286.5 g. Thus the catalyst productivity is 71.6 kg. of tris-alcohol per mole of catalyst. (A mole of catalyst is considered as one mole of nickel carbonyl (170.75 g.) and one mole of the triaryl phosphite.)

Example 4

The process and raw materials used were identical to those of Example 2 except that an isoheptane mixture instead of benzene was the solvent. When the reaction was run for 3 hours the yield of tris-alcohol was 270 g. (90% of theory). When the reaction was run for 5 hours the yield was 281 g. (94% of theory).

Example 5

The process and raw materials used were identical to those of Example 4 except that cyclohexane instead of benzene was the solvent. The yield of tris-alcohol (M.P. 137–45°) was 238 g. (79.5% of theory).

Example 6

A two liter jacketed resin kettle was equipped with a stainless steel anchor type stirrer, a pressure equalized addition funnel and three efficient reflux condensers. Benzene (450 ml.) was placed in the kettle. Then 6.2 g. (0.012 m.) of tris(2-t-butyl-5-methylphenyl)phosphite and 1.56 ml. (0.012 m.) of nickel carbonyl were added to the benzene. The mixture was heated by circulating steam through the reactor jacket and 900 g. (10.71 m.) of methylbutynol was added over a two-hour period. The reaction mixture darkened within 15 minutes and after 80 minutes, the reaction mixture began to reflux vigorously and the steam was shut off. After crystalline product began to separate spontaneous refluxing continued for 2.5 hours and then external heating was resumed. After 5 hours total reaction time, the product was isolated by filtration and was washed with benzene to remove color. The yield of tris-alcohol (M.P. 140–147°) was 822 g. (91.5% of theory).

Example 7

The apparatus and raw materials used were identical to those of Example 6 except that acetone instead of benzene was used as the solvent. The yield of tris-alcohol (M.P. 141–51°) was 757 g.

An additional 61 g. of tris-alcohol was obtained by concentrating the acetone mother liquors to one-half their original volume. The total yield was 818 g. (91% of theory).

Example 8

The apparatus and raw materials were identical to those described in Example 7 except that the tris(2-t-butyl-5-methylphenyl)phosphite was replaced by some of the phosphites of Table II. The data obtained appear in the following Table V.

TABLE V

| Triaryl phosphite [(ArO)$_3$P] Ar | Tris-alcohol Yield, (percent) | Tris-alcohol M.P. (not recrystallized) |
|---|---|---|
| 2-t-butyl-5-methylphenyl | 93 | 142–150 |
| 2-t-butylphenyl | 80 | 131–140 |
| 2-t-butyl-4-methylphenyl | 90 | 137–148 |
| 2,5-di-t-butylphenyl | 65 | 137–145 |
| 2,4-di-t-butylphenyl | 81 | 145–151 |
| 2,4-di-t-amylphenyl | 91 | 127–145 |
| 2-t-amylphenyl | 83 | 139–150 |
| 2-t-butyl-4-phenylphenyl | 59 | 137–147 |
| 2-cyclohexylphenyl | 31 | 143–147 |

The high specificity of the catalyst system is clearly illustrated by the following examples:

Example 9

The apparatus and raw materials were identical to those described in Example 2 except that cobalt carbonyl [$Co_2(CO)_8$, 0.002 m.] instead of nickel carbonyl was used as catalyst. No crystalline product could be isolated.

Example 10 (Example 1 of French Pat. 1,397,654)

A 300 ml. flask was equipped with stirrer, thermometer and reflux condenser with provision for operating under a nitrogen atmosphere.

Hexane (100 ml.), 85 g. (1 mole) of methylbutynol and 0.3 g. of cobalt tricarbonyl nitrosyl were placed in the flask. The mixture was heated to reflux for 3.5 hours. After 30 minutes a solid began to separate.

The crystalline product was filtered off, washed well with pentane and air-dried. The yield of product (M.P. 180–185°) was 85 g. (100% of theory). Recrystallization from acetone raised the melting point to 185–187°. This compound was identified by nuclear magnetic resonance spectra as 1,2,4-tris($\alpha$-hydroxyisopropyl)-benzene.

Example 11 (Example 1 of U.S. 2,542,551)

Dicarbonylnickel bis(triphenylphosphine) was prepared according to the method of King, Organometallic Synthesis, vol 1, Academic Press, New York 1965, page 168.

The apparatus was identical to that described in Example 2. Into the flask was placed 2 g. (0.0053 m.) of dicarbonylnickel bis(tri-phenylphosphine), 168 g. (2.0 m.) of methylbutynol and 400 ml. of benzene.

The mixture was heated to reflux for 9 hours, then treated with activated charcoal and filtered hot. On cooling, no crystals separated. The solvent was stripped off in vacuo leaving 100 g. of a dark viscous oil. The dark oil partially crystallized on standing over night at room temperature. The crystals were filtered off and washed with cold benzene. A second crop of crystals was obtained from the mother liquors. Recrystallization from ethyl acetate gave 14 g. (8.3% of theory) of product melting at 144–6° C. (reported; 140–2° C.).

Example 12 (Procedure of Merriweather et al.) Org. Chem. 26, 5155 (1961)

A two-liter flask was equipped with stirrer and two reflux condensers with provision for operating in a nitrogen atmosphere. Benzene (920 ml.), 66.3 g. (0.79 m.) of methylbutylnol and 1.96 g. (0.0052 m.) of dicarbonyl nickel bis(triphenylphosphine) were charged to the flask. The mixture was heated to reflux, in a nitrogen atmosphere for 8 hours and the reaction mixture was stirred in vacuo. The residue (16 g. 24% of theory) was a dark viscous tar. The residue was dissolved in 50 ml. of boiling benzene. On cooling, the benzene solution deposited a crystalline product (3 g.) melting at 147–149° (reported 141–142° C.).

It is clear from the very low yield shown in Examples 11 and 12 that those prior art methods, regardless of what the product might be, cannot be used in any commercial process.

Example 13

Following the essential procedure of Example 1, various triarylphosphites closely related to, but outside the definition of those operable in the invention, were used.

The following Table VI indicates the inoperability of these phosphites:

TABLE VI

| Triaryl Phosphite (ArO)₃P Ar | Yield (percent) | Product |
|---|---|---|
| Phenyl | 5 | Over 85% of 1,2,4,7-cyclotetramer and 5 to 10% of 1,3,5,7-cyclotetramer. |
| 3-methyl phenyl | 12 | Do. |
| 3-t-butyl phenyl | 16 | Do. |
| 4-t-butylphenyl | 4 | Do. |
| 3,5-di-t-butylphenyl | 10 | Do. |
| 2,6-di-isopropylphenyl | 21 | Over 90% of 1,2,4,7-cyclotetramer. |
| 2-t-butyl-6-methylphenyl | 18 | Do. |
| Isopropyl | 16 | Over 85% of 1,2,4,7-cyclotetramer. |

Example 14.—Preparation of tris peroxide

Into an open top jacketed reactor was charged 21 g. (0.15 m.) of 70% sulfuric acid. The acid was cooled to −10° C. by circulating ice-brine through the reactor jacket. Then 21 g. (0.21 m.) of 90% t-butyl hydroperoxide was added slowly and cautiously while not allowing the temperature to rise above 0° C. Cyclohexane (15 ml.) was added to the reactor followed by 12.6 (0.05 m.) of tris-alcohol prepared as in Example 2 was added portionwise over a 15 minute period while maintaining the temperature at 0° C. The sides of the reactor were washed down with 20 ml. of cyclohexane. The reaction mixture was then stirred for 3 hours at 0° C. and 3.5 hours at 20° C.

When the stirring was completed, the reaction mixture was transferred to a 250 ml. reactor along with 125 ml. of ether (to dissolve the white solid) and 50 ml. of water. The aqueous acid layer was discarded. The organic layer was washed with three 75 ml. of water, 75 ml. of 5% sodium bisulfite solution, 75 ml. of 5% sodium bicarbonate solution and finally with two 75 ml. portions of water. The ethereal solution was dried ($MgSO_4$), filtered and stripped in vacuo. The yield of tris peroxide, a yellow oil, $n_D^{25}=1.4648$, was 20.8 g. (87.2% of theory).

Example 15.—Cross-linking evaluations on ethylene-propylene rubber

Formulations, as shown in Table VII were milled to an intimate plastic mixture on a two-roll mill. The temperature of the mix during milling was held below 250° F. At these conditions no scorching occurred.

The intimately mixed vulcanizable mass was removed from the roll mill and a portion placed in a mold in a hydraulic press and heat cured. The curing temperatures were varied depending upon the peroxy crosslinking agent used. The optimum cure temperature for each peroxide is reported. Immediately, upon removal from the curing press, the cured slabs were permitted to mature at room temperature for about 24 hours. This maturing time was sufficient to give reproducible results. The matured slabs were then cut into dumbbell shaped specimens and tested for tensile strength on an Instron Tensile Tester, following ASTM procedure as described in D412–61T, "Tension Testing of Vulcanized Rubber."

As can be seen from the data of Table VII, far less tris peroxide is required to give a commercially acceptable vulcanized composition. Also there is none of the objectionable odor associated with the vulcanized composition as is the case with composition vulcanized with bis($\alpha,\alpha$-dimethylbenzyl)peroxide.

TABLE VII.—VULCANIZATION OF
ETHYLENE-PROPYLENE RUBBER FORMULATION

EPR 404 [1] = 100 parts
SRF carbon black = 60 parts
Sulfur = 0.3 part

| Peroxide | Tris-t-BF [2] | | DCPt [3] | |
|---|---|---|---|---|
| Parts | 1.56 | 2.34 | 2.91 | 4.36 |
| Cure temperature, °F | 340 | 340 | 320 | 320 |
| Cure time, min | 30 | 30 | 30 | 30 |
| 300% modulus, p.s.i | 866 | 1,560 | 1,027 | 1,526 |
| Ultimate tensile, p.s.i | 2,133 | 2,152 | 2,020 | 1,972 |
| Percent elongation | 612 | 400 | 506 | 375 |
| Odor | (4) | (4) | [5] Yes | [5] Yes |
| Blooming | (4) | (4) | (4) | (4) |

[1] Enjay Chemical Co.—40:60 ethylene: propylene content; no oil extender.
[2] Tris-t-BF = Tris t-butylperoxy derivative of the tris alcohol composition.
[3] DCPt = Technical grade of bis($\alpha,\alpha$-dimethylbenzyl) peroxide.
[4] None.
[5] Due to decomposition products such as acetophenone.

I claim:
1. A process for the preparation of 1,3,5-tris($\alpha$-hydroxyisopropyl)benzene which comprises heating at a temperature from 40° to 120° C. in an inert organic solvent, methyl butynol in the presence of a catalytic amount of nickel tetracarbonyl and an ortho-substituted aryl phosphite of structure

$$(R_nArO)_3P$$

where Ar is an aryl radical selected from the group consisting of phenyl and naphthyl, R is alkyl having one to six carbon atoms cycloalkyl, or phenyl, and $n$ is an integer of from zero to six and the second ortho position of the aryl radical to the oxygen is unsubstituted.

2. A process for the preparation of 1,3,5-tris($\alpha$-hydroxyisopropyl)benzene which comprises heating, at a temperature from 40° to 120° C. in an inert organic solvent, methyl butynol in the presence of a catalytic amount of nickel tetracarbonyl and a phosphite of structure

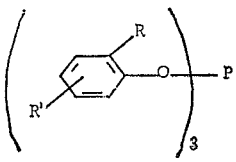

Where R is alkyl containing one to six carbon atoms or aryl, and R' is in a meta or para position and is hydrogen, alkyl of one to six carbon atoms or aryl.

3. A process as in claim 2 where the aryl phosphite is tris(2-t-butyl-5-methylphenyl)phosphite.

4. A process as in claim 2 where the aryl phosphite is tris(2-t-butyl-4-methylphenyl)phosphite.

5. The process of claim 2 where the phosphite is tris(2-t-butylphenyl)phosphite.

6. The process of claim 2 where the phosphite is tris(2,4-di-t-amylphenyl)phosphite.

7. The process of claim 2 where the phosphite is tris(2,4-di-t-butylphenyl)phosphite.

8. The process of claim 3 where the solvent is a mixture of iso-heptanes.

9. The process of claim 5 where the solvent is a mixture of iso-heptanes.

10. The process of claim 3 where the solvent is benzene.

11. The process of claim 5 where the solvent is benzene.

References Cited

UNITED STATES PATENTS 2,542,551  2/1951  McKeecer et al. _____ 260—618

FOREIGN PATENTS 1,159,951  12/1963  Germany _____ 260—618 R
1,042,459  9/1966  Great Britain _____ 260—618 R HOWARD T. MARS, Primary Examiner U.S. Cl. X.R.

252—431